(12) United States Patent
Espinoza et al.

(10) Patent No.: US 6,347,457 B1
(45) Date of Patent: Feb. 19, 2002

(54) LASER BASED CENTERLINE GAUGE CONVERSION KIT

(75) Inventors: Michael L. Espinoza; Byron K. Coffman, both of Wichita, KS (US)

(73) Assignee: ECCC, Inc., Wichita, KS (US)

( * ) Notice: Subject to any disclaimer, the term of this patent is extended or adjusted under 35 U.S.C. 154(b) by 0 days.

(21) Appl. No.: 09/523,040

(22) Filed: Mar. 10, 2000

(51) Int. Cl.⁷ .............................. G01B 5/25; G01B 11/27
(52) U.S. Cl. .............................. 33/288; 33/286; 33/608; 33/DIG. 21
(58) Field of Search ........................... 33/286, 288, 608, 33/DIG. 21

(56) References Cited

U.S. PATENT DOCUMENTS

| | | | |
|---|---|---|---|
| 3,869,804 A | * | 3/1975 | Friend .......................... 33/288 |
| 4,330,945 A | | 5/1982 | Eck |
| 4,441,259 A | | 4/1984 | Leitermann et al. |
| 4,454,659 A | | 6/1984 | Eck |
| 4,513,508 A | | 4/1985 | Jarman et al. |
| 4,578,870 A | | 4/1986 | Cooke |
| 4,630,379 A | | 12/1986 | Wickmann et al. |
| 4,683,663 A | * | 8/1987 | Sarauer ......................... 33/288 |
| 4,689,888 A | * | 9/1987 | Aldrich et al. ................. 33/288 |
| 4,703,563 A | * | 11/1987 | Hoshino et al. ........ 33/DIG. 21 |
| 4,942,667 A | | 7/1990 | Fournier |
| 5,029,397 A | | 7/1991 | Palombi |
| 5,125,164 A | | 6/1992 | Fournier et al. |
| 5,131,257 A | * | 7/1992 | Mingardi ...................... 33/608 |
| 5,507,101 A | * | 4/1996 | Mason ......................... 33/608 |
| 5,515,613 A | | 5/1996 | Hinson |
| 5,644,854 A | | 7/1997 | Bergeron |
| 5,647,139 A | * | 7/1997 | Richardson ................... 33/608 |

* cited by examiner

Primary Examiner—Diego Gutierrez
Assistant Examiner—Madeline Gonzalez
(74) Attorney, Agent, or Firm—Shughart Thomson & Kilroy P.C.; Marcia J. Rodgers

(57) ABSTRACT

A laser based vehicle alignment kit is installed on an existing centerline gauge system to provide a pair of laser beams directed towards one end of a vehicle and a center laser which may be rotated 360° to simultaneously direct a beam towards the opposed end of the vehicle. The system includes a plurality of horizontal mounting bars, each equipped with structure for coupling with the center assembly of a centerline gauge and a pair of dependent blocks for leveling engagement with the gauge crossbars. One bar is equipped with a laser at each lateral end as well as a laser mounted above the center point of the gauge assembly. The center laser is rotatable 360° about an axis perpendicular with the bar. The remaining bars each include three upstanding transparent targets for sighting alignment with the lasers. The rotatable center laser is coupled with a scale and a series of stops for parallel or perpendicular alignment of the beam with respect to the lateral beams. The center laser may also be rotated to establish a datum plane. A measurement system includes a laser equipped bar mounted between at least two target bars.

26 Claims, 3 Drawing Sheets

LASER BASED CENTERLINE GAUGE CONVERSION KIT

BACKGROUND OF THE INVENTION

1. Field of the Invention

The present invention is broadly concerned with a laser referenced system for vehicle alignment. More particularly, it is concerned with a kit for converting a centerline gauge system to laser operation.

2. Description of the Related Art

Vehicular collision damage is assessed and repaired by a method involving measurement of the damage to the structure or frame of the vehicle, comparison of the measurements to dimensional data available in published manuals known as data books, followed by mechanical straightening or pulling of the frame into correct alignment. The fundamental tool for assessing misalignment of the frame is the centerline gauge system. This system consists of a series of self-centering gauges which are suspended from the frame or unibody structure of a damaged vehicle. The gauges are each equipped with an upstanding center sighting pin. Structural misalignment is determined by visually sighting along the pins, and the frame or structure is pulled into alignment while the gauges are installed on the vehicle, and the alignment is verified by a final sighting.

Such gauges are inexpensive, easy to install and use, and capable of withstanding rough service. However, visual sighting of the center pins by even an experienced mechanic may lack the accuracy provided by gauges which are equipped with lasers. Known laser gauges are not well-suited for use in all body shops, since they may be prohibitively expensive, time consuming to set up, may require special training to operate, and may require a costly computer support system.

In addition, known laser gauges are designed to sight along the length of a vehicle from a position taken at one end. Where the vehicle has sustained damage to both the front and rear sections, the only reliable datum point may be near the center of the vehicle. In such cases it is not possible to sight accurately from either end of the vehicle. The laser gauge must then be removed and remounted at various points along the length of the vehicle to obtain an accurate measurement of the pattern of misalignment. Even where the vehicle has not sustained crush damage at both ends, pulling one end of the frame during the repair process may force the opposed end of the frame out of alignment.

Thus, there is a need for a laser conversion kit for a conventional centerline gauge system which also permits simultaneous sighting of both the front and rear portions of a vehicle frame.

SUMMARY OF THE INVENTION

The present invention provides a greatly improved laser based vehicle alignment system kit which may be easily installed on an existing centerline gauge system and which provides a pair of laser beams directed toward one end of a vehicle and a third, center laser which may be rotated 360° to simultaneously direct a beam toward the opposed end of the vehicle.

The system includes a plurality of horizontal support bars, each equipped with structure for coupling with the center assembly of a centerline gauge and a pair of dependent blocks for leveling engagement with the crossbars slidable through the center assembly of the gauge for adjusting the overall width of the gauge. One of the bars supports a laser source at each lateral end as well as a laser source mounted above the center point of the gauge center assembly. The center laser is rotatable 360° about an axis perpendicular with the bar. The remaining bars each support three spaced transparent targets for sighting alignment with corresponding ones of the lasers. The rotatable center laser is preferably coupled with an angular or degree scale for preselected parallel or perpendicular alignment of the beam with respect to the lateral beams. The center laser may also be rotated to establish a datum plane. A measurement system equipped with the kit includes a laser bar mounted between at least two target bars.

In an alternate embodiment, the lateral ends of each bar may include pairs of blocks having structure permitting rotation of one of the blocks in a plane parallel with the bar as well as biased displacement of the remaining block in a plane perpendicular with the bar. Such structure permits passage of the one of the blocks between and through the horizontal crossbars of a centerline gauge followed by rotation to a transverse position in order to capture the crossbars snugly between the bar and the block pair. Such structure makes the system particularly well suited for use with a set of centerline gauges mounted in a depending orientation with respect to a vehicle.

OBJECTS AND ADVANTAGES OF THE INVENTION

The principal objects and advantages of the present invention include: providing a kit for converting a conventional, visually sighted centerline gauge system to laser operation; providing such a kit having gauges which can be mounted in the existing center pin apertures of a centerline gauge assembly; providing such a system including structure permitting coupling of each of a plurality of support bars with the center assembly of a centerline gauge system; providing such a system having a plurality of support bars, each including a pair of blocks for leveling the bars in parallel alignment with the centerline gauge center assembly; providing such a system which may be coupled with a centerline gauge system which is installed in inverted orientation on a vehicle; providing such a system having rotatable blocks; providing such a system in which the blocks may be displaced through and rotated to capture the crossbars of a centerline gauge assembly; providing such a system which projects three laser beams; providing such a system which includes a plurality of laser beam projecting devices, at least one of which is rotatable 360° about an axis perpendicular to the support bar; providing such a system having a 360° horizontal scale; providing such a system having a 360° vertical scale; providing such a system having transparent targets which may be aligned with each of the laser sources; providing such a system having targets bearing sighting indicia; providing such a system in which two laser sources each project a beam in parallel alignment toward one end of a vehicle and a third laser source projects a beam in reverse parallel alignment toward an opposed end of the vehicle; and providing such a device which is precise and convenient to use, economical to produce and particularly well-adapted for its intended purposes.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
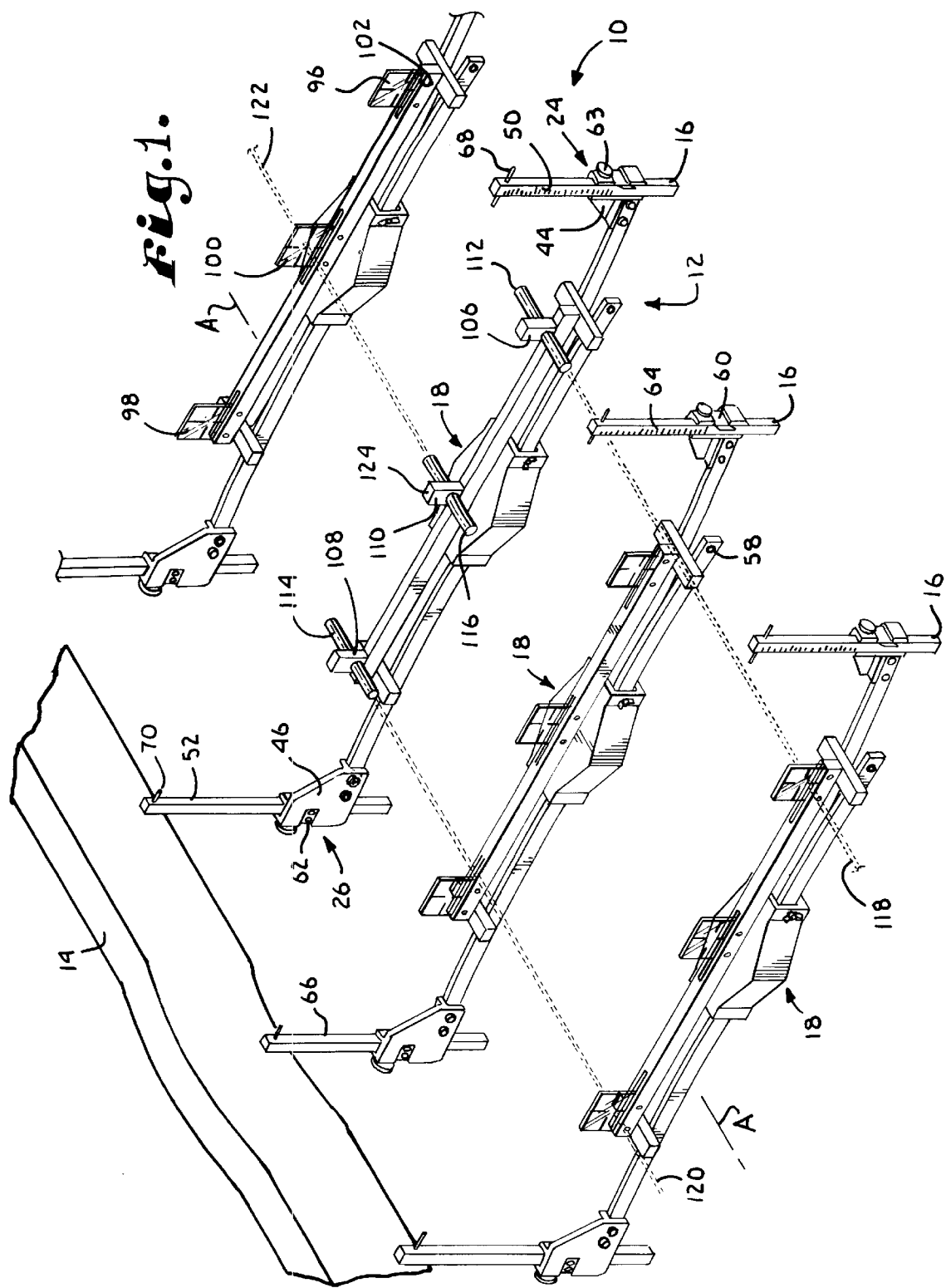
FIG. 1 is a perspective view of a laser based alignment system in accordance with the invention installed on a centerline gauge system shown mounted on a fragmentary frame of a vehicle.
Figure 2:
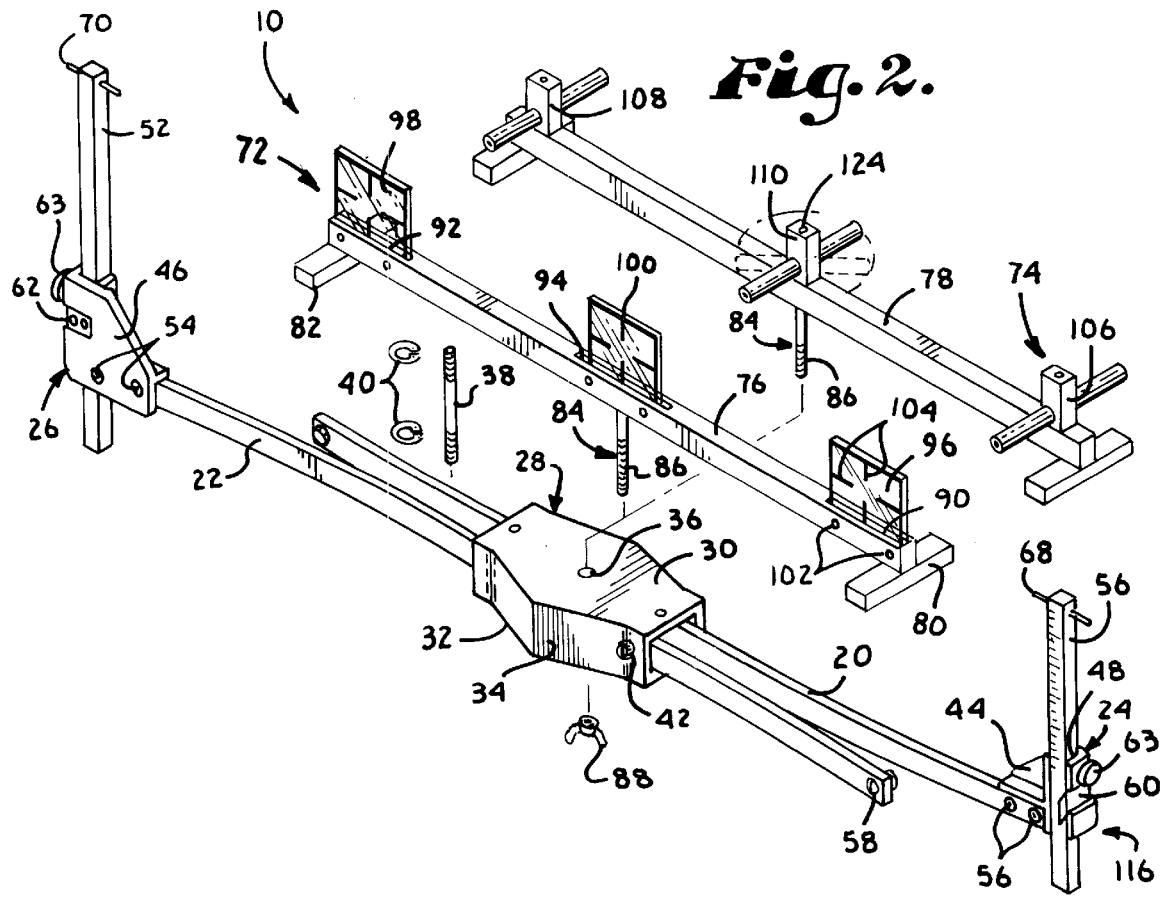
FIG. 2 is an exploded perspective view of a vehicle centerline gauge with the center sighting pin removed to permit the center pin aperture to receive a laser target gauge or laser gauge.

Referring now to FIGS. 1 and 2, the reference numeral 10 refers to a laser based centerline gauge conversion kit in accordance with the invention and is depicted and preferably employed in conjunction with a centerline gauge system 12 installed on a vehicle frame structure 14. The frame structure 14 is intended to include both the conventional vehicle frame encountered in body-over-frame construction as well as the corresponding structure in so-called unibody vehicle construction. The gauge system 12 includes a set of centerline gauges 16 of self-centering construction including a center assembly 18, through which is mounted a laterally adjustable crossbar assembly 19, including pair of elongate crossbars 20 and 22, each of which is coupled at its lateral end with a scale mounting assembly 24 and 26.

In more detail, the center assembly 18 includes a generally lozenge shaped, open-ended housing 28 having upper and lower planar surfaces 30 and 32 and side surfaces 34. The upper and lower surfaces 30 and 32 each include a central aperture 36, for demountably receiving a center sighting pin 38, which is held in place by a pair of C-ring type keepers 40. Each side surface 34 is apertured for receiving a thumbscrew 42 therethrough. The center assembly 18 also includes a system of rollers and bearings (not shown), which permit the crossbars 20 and 22 to be laterally telescopically extended and retracted while maintaining the position of the center assembly 18 and frictionally restraining the crossbars 20 and 22 against slippage and play.

Each scale mounting assembly 24 and 26 includes a respective mounting bracket 44 and 46, having channels 48 for supporting a lateral end of one of the horizontal crossbars 20 and 22 and an upright scale member 50 or 52 in orthogonal relation. The lateral end of each of the crossbars 20 and 22 is secured to the respective mounting bracket 44 or 46 by bolts and nuts 54 and 56 or other suitable means. The opposed end of each of the crossbars 20 and 22 includes a stop 58, to secure the bar against overextension and resulting disengagement from the center assembly 18. Each of the vertical scales 50 and 52 are demountably secured to a respective mounting bracket 44 or 46 by a retainer clip 60, which is secured to the bracket 44 or 46 by machine screws 62. The upper side portion of each mounting bracket 44 and 46 is apertured to receive an adjustable thumbscrew 63, which may be employed to further secure the scale 50 or 52 in the channel 48. The upright scale members 50 and 52 each include a linearly calibrated measuring tape or strip 64 or 66. The upper end of each scale is laterally bored through to receive one of rolled hanger pins 68 and 70. In order to accommodate vehicles of various sizes, interchangeable scales 50 and 52 having varying lengths may be provided, most commonly in regular lengths from about 8 inches to about 24 inches.

As best shown in FIGS. 1 and 2, the conversion kit 10 of the present invention includes a plurality of target gauge assemblies 72 and at least one laser gauge assembly 74, each including a respective target or laser assembly mounting and support bar 76 or 78.

Each support bar 76 and 78 is equipped with a pair of leveling blocks 80 and 82 and a depending center pin 84. The center pin 84 may be equipped with threads 86 and an adjustable keeper 88, such as, for example, a wing nut. The support bars 76 and 78 are preferably constructed of cast or extruded metal bar stock, such as, for example, about ¾×½ inch aluminum, in any length which is compatible with the centerline gauge system 12. The leveling blocks 80 and 82 are preferably constructed of the same material in a length of about 3 inches and are coupled with the ends of the support bars 76 or 78 by welding, soldering, or the use of fasteners such as bolts or screws. Those skilled in the art will appreciate that any suitable material or combination of materials and fastening means capable of withstanding rough service, including synthetic resin materials may be employed in the construction of the gauge assemblies 72 and 74.

The target support assembly includes a support bar 76 having a pair of laterally spaced outboard longitudinal slots 90 and 92 and a center slot 94, positioned directly above the center pin 84, for receiving outboard targets 96 and 98 and center target 100, respectively. The targets 96, 98, and 100 are constructed of a transparent synthetic resin material such as, for example, polymethylmethacrylate sold by Rohm and Haas under the trademark Plexiglas™. They are held in place in the slot by means of bolts 102. It is foreseen that use of shims and/or an adhesive substance may be employed to secure the targets against front to rear movement within the slots 90, 92, and 94. Each target 96, 98 and 100 is equipped with sighting indicia 104, which outline the perimeter of the target and divide the field of the target into quadrants for use in calibrating frame misalignment. In preferred embodiments, the indicia 104, which resemble crosshairs stop short of convergence at the center of the target.

Laser gauge assembly 74 includes a support bar 78 having pair of laterally spaced outboard laser source mounting brackets 106 and 108 and a center bracket 110. The outboard brackets 106 and 108 may be permanently installed by soldering or welding, or the support bar 78 may be slotted as previously described and the brackets may be demountably installed in the slots. The support bar 78 is vertically bored through at its center to receive the center pin 84, a portion of which extends upwardly, above the bar 78 to form a pintle (not shown). The lower portion of the center bracket 110 is apertured to receive the pintle. The brackets are horizontally bored through to receive the elongate barrels of a pair of lateral laser sources 112, 114, and a center laser source 116. The brackets 106, 108 and 110 are positioned on the bar 78 for alignment of the laser sources 112, 114 and 116 with the targets 96, 98 and 100 upon installation of a gauge system 12 coupled with the kit 10 on a vehicle frame 14.

The laser sources 112 and 114 are oriented in the brackets for projection of a pair of laterally spaced outboard laser beams 118 and 120 in a first direction. The center laser source 116 is oriented in the center bracket 110 so that it may be rotated in a horizontal plane for directing a central laser beam 122 in another direction, preferably an opposed, second direction. The top surface of each bracket includes a threaded aperture 124 for receiving a set screw for holding the laser source in place. Any suitable laser source capable of projecting a narrow cylindrical beam of coherent, collimated light toward the targets may be employed, such as, for example, Tacstar® Laser Lyte Model WPL-2000sts dot laser sources.

The centerline gauge conversion kit of the present invention is used in conjunction with a centerline gauge system 12, having at least three gauges. The kit gauges 72 and 74 are installed by a user who first removes a keeper 40 from the center pin 38 of a gauge 16 and next removes the pin 38 from the center assembly 18. Where the vehicle to be repaired is of body-over-frame construction, the user inserts the pin 84 of a target or laser gauge assembly 72 or 74 into the central aperture 36 until the bottom surface of the support bar 76 or 78 rests on the center assembly housing supper surface 30 and the leveling blocks 80 and 82 rest on the crossbars 20 and 22. The user adjusts the alignment of the support bar 76 or 78, if necessary, so that the bar is aligned with the longitudinal axis of the center assembly housing 28. The user installs a keeper 88 over the center pin 84 and snugs the keeper against the lower surface 32 of the housing 28 in order to secure the target or laser gauge assembly 72 or 74 in place against both vertical and pivotal movement about the center pin 84. The process is repeated until at least two target gauge assemblies 72 and one laser gauge assembly 74 have been mounted on respective centerline gauges 16. Where the vehicle is of unibody construction, the target and laser gauge assemblies 72 and 74 are installed in inverted relationship to the centerline gauges 16, so that the support bars 76 and 78 rest against the lower surface 32 of the center assembly housing.

The user next hangs the laser gauge assembly 74 from a predetermined undamaged location near the center of the vehicle by inserting the hanger pins 68 and 70 into corresponding lateral points on opposite sides of the vehicle frame 14. The gauge crossbars 20 and 22 are locked in place by tightening the thumbscrews 42.

In the same manner, a user installs at least one target gauge assembly 72 on either side of the laser gauge assembly 74, adjacent the front and rear ends of the vehicle, respectively. The user rotates the center laser source 116 until it is positioned in opposed parallel alignment with respect to lateral laser source 112 and 114. The user actuates the center laser source 116 to project a center beam 122 rearwardly toward a center target 100 and actuates the lateral laser sources 112 and 114 to project beams 118 and 120 forwardly toward lateral targets 96 and 98. Failure of any of the beams to pass through the center portion of the respective target indicates a misalignment of the vehicle, such as, for example, sag, sidesway, twist or out-of-level. By reading and recording a series of measurements taken from the tapes 64 and 66 and comparing them with published vehicle dimension specifications, a user can determine the location, severity and pattern of underbody damage. By performing a series of pulls or other applications of force necessary to return the damaged area to proper dimensions while the gauges 16 remain in place, the damage can be corrected and verifying measurements taken. Those skilled in the art will appreciate that alternatively, the center beam 122 may be projected forwardly and the lateral beams 118 and 120 may be projected rearwardly, also the center beam 122 may be rotated 360° to establish a datum plane. Any number of additional target gauge assemblies 72 coupled with centerline gauges 16 may be mounted both forwardly and rearwardly of the laser gauge assembly 74. Depending on the pattern of damage to the vehicle, the laser gauge assembly 74 may be mounted forwardly or rearwardly of the center at any other suitable undamaged location on the underside of the vehicle. In addition, while the invention has been described as a kit for converting a conventional centerline gauge system to a laser based system, it is foreseen that the resulting laser based alignment system could be manufactured in its entirety.

Figure 3:
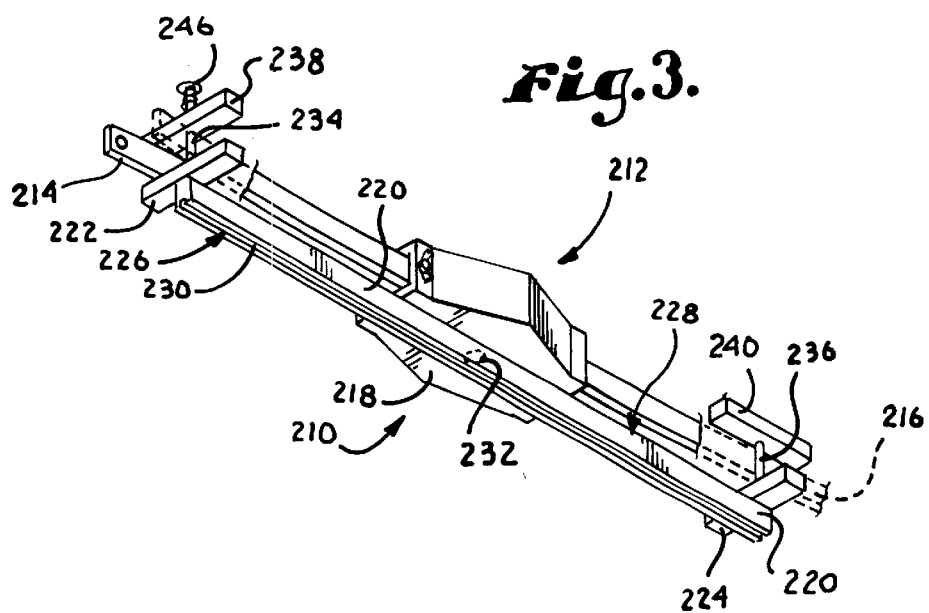
FIG. 3 is a perspective view of an alternate embodiment of the apparatus of FIG. 1 shown in an inverted orientation.
Figure 4:
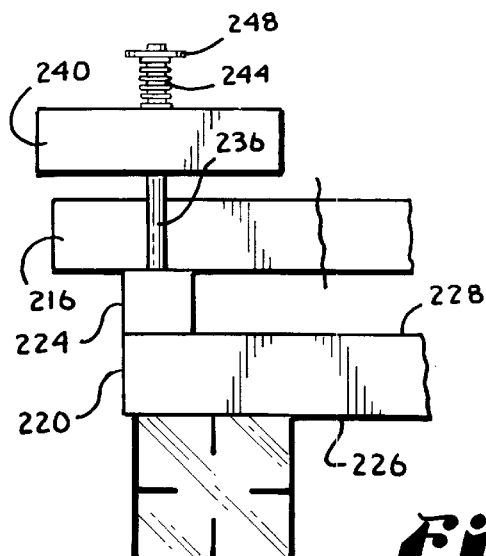
FIG. 4 is a greatly enlarged partial sectional view of an embodiment similar to that depicted in FIG. 3, showing a biasing spring in a fully compressed and the blocks at their extended position.
Figure 5:
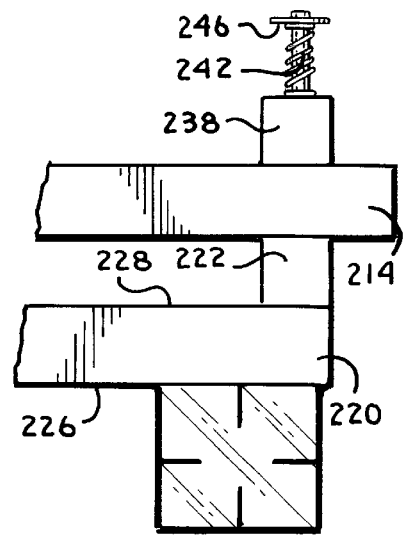
FIG. 5 is a partial sectional view of an embodiment similar to that depicted in FIG. 3, showing the biasing spring in an extended position urging the blocks together on opposite sides of a crossbar.

A first alternate embodiment of a centerline gauge conversion kit 210 is depicted in FIGS. 3–5 in conjunction with a centerline gauge 212 having a pair of crossbars 214 and 216 and a center assembly 218. This embodiment is particularly well-suited for use in an inverted orientation on damaged vehicles having unibody construction. The structure of this embodiment is substantially similar to that previously described, including an elongate support bar 220 coupled with a pair of lateral leveling blocks 222 and 224.

The support bar 220 includes lower and upper surfaces 226 and 228. The bar lower surface 226 includes an elongate channel 230, extending substantially the length thereof for receiving a set of targets or laser mounting brackets. The bar upper surface 228 includes a central aperture 232 for receiving the terminal portion of a downwardly projecting center sighting pin (not shown) of the centerline gauge 212.

The uppermost center surface of each block 222 and 224 is coupled with a pin 234 or 236 by soldering, welding, or threaded connection. A pair of retainer blocks 238 and 240 are each bored through at the center for slidable mounting on the pins 234 or 236. The leveling and retainer blocks 222, 224, 238 and 230 are of construction and dimensions similar to those previously described. Compression springs 242 and 244 encircle the uppermost portions of respective pins 234 and 236 and bias the retainer blocks 238 and 240 toward the respective leveling blocks 222 and 224. Keepers 246 and 248 engage the ends of the respective pins 234 and 236 to limit the springs.

In use, the kit 210 is installed on a centerline gauge 212 by rotating the retainer blocks 238 and 240 in a plane parallel with the bar 220. Thus aligned, the retainer blocks 238 and 240 pass between the crossbars 214 and 216 when the aperture 232 is urged into registry with the projecting lowermost portion of the center sighting pin of a centerline gauge 212 for seating the support bar 220 below the center assembly 218. The user then grasps the retainer blocks 238 and 240 and urges them toward a respective keeper 246 or 248 while compressing a respective spring 242 or 244 until the blocks clear the crossbars 214 and 216.

The user again rotates the blocks 238 and 240 in a plane parallel with the bar 220 until they are positioned approximately perpendicular to the crossbars 214 and 216. The user then releases the blocks 238 and 240, permitting the springs 242 and 244 to urge the blocks snugly against the crossbars 214 and 216. In this manner, the crossbars are captured between the leveling blocks 222 and 224 and the retainer blocks 238 and 240. A user then mounts the centerline gauge 212 on a vehicle unibody structure as previously described, with the gauge assembly in dependent orientation.

Figure 6:
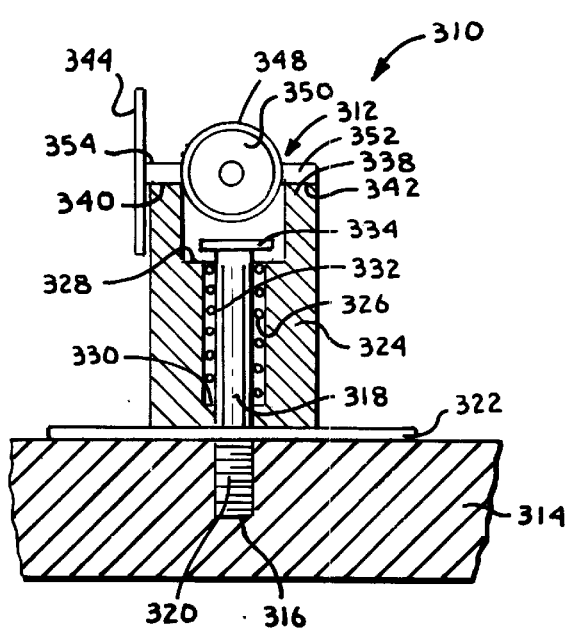
FIG. 6 is a front elevational view of an alternate embodiment of a rotating laser assembly.
Figure 7:
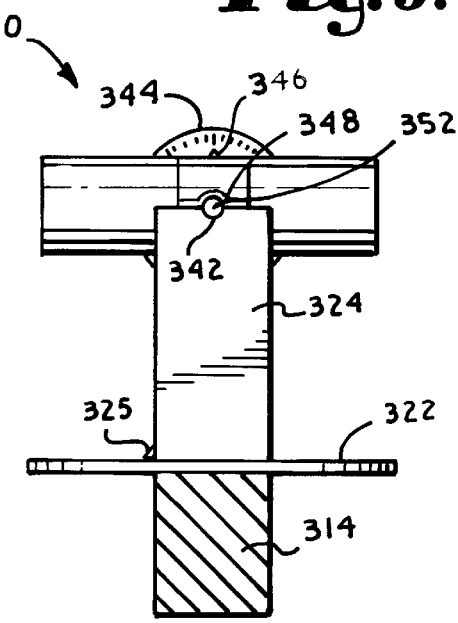
FIG. 7 is a side elevational view of the alternate embodiment depicted in FIG. 6.

A second alternate embodiment of a centerline gauge conversion kit 310 is depicted in FIG. 6. The structure of this embodiment may be substantially similar to either of the embodiments previously described, except for the center laser assembly 312, which is depicted in association with a laser support bar 314. The bar 314 includes a central bore 316, for receiving a pintle 318. The lowermost portion of the pintle 318 includes threads 320 for securing the pin 318 to the bar 314. It is foreseen that the pin 318 may also be attached to the bar 312 by welding or any other suitable means.

A 360° dial-type scale 322 having a central aperture for receiving the pintle 318 is coupled with the upper surface of bar 314 by any convenient means, such as soldering, or the use of fasteners or an adhesive substance. A generally cylindrical pedestal 324 includes an indicator 325, such as a notch for registry on the scale 322. The pedestal 324 has an axial bore 326 for receiving the pintle 318. The bore 326 includes upper and lower shoulders 328 and 330 for retaining in place a compression spring 332 which encircles the pintle 318. A keeper 334 engages the upper end of the pintle 318. The uppermost portion of the pedestal 324 is slotted to form a pair of legs 336 and 338, equipped with respective slots or grooves 340 or 342. One of the legs 336 or 338 is laterally coupled with a second dial type 360° scale 344. The leg 336 or 338 includes an indicator 346, for registry on the scale 344.

A yoke 348 encircles a laser-generating device 350. The yoke 348 includes a pair of lateral extensions or arms 352 and 354 which are received in slots 340 and 342, respectively.

In use, an operator aims the laser generating device 350 upwardly and downwardly toward a target by pivotally rotating the arms 352 and 354 within the slots 340 and 342. The angle of inclination may be obtained by reading the position of the indicator 346 on the scale 344. The operator grasps the laser source 350 and rotates it, either in a sweeping motion to establish a datum plane, or to a preselected location, such as a target suspended from the underside of the vehicle. The pedestal 324 is retained in place adjacent the scale by the action of compression spring 332 against the pedestal lower shoulder 330. The location of the point may be verified by reading the position of the indicator 325 on the scale 322. In the preferred embodiment, the pedestal 324 is rotated until the laser source 350 is positioned to generate a beam toward a point 180° from the direction of the beams generated by a pair of laterally mounted laser sources. In this manner, a central reference point can be used to measure alignment of both the front and rear portions of a vehicle.

While the present invention is described herein in kit form for coupling with a conventional centerline gauge system, it is foreseen that a laser based alignment system in accordance with the invention could be manufactured in its entirety. It is to be understood that while certain forms of the present invention have been illustrated and described herein, it is not to be limited to the specific forms or arrangement of parts described and shown.

What is claimed and desired to be secured by Letters Patent is as follows:

1. A laser conversion kit for a vehicle frame alignment system having a plurality of alignment gauges, each gauge including a center assembly and a laterally adjustable crossbar assembly, said crossbar assembly having lateral ends coupled with respective upright members for supporting the gauges from and beneath a vehicle frame structure and in fixed spaced relation therealong, said kit comprising:

a) a laser gauge assembly including a generally horizontal laser support bar supporting a laser source beneath said frame structure;

b) a target gauge assembly, including a generally horizontal target support bar supporting a target beneath said frame structure; and c) each of said laser and target support bars engaging respective crossbar assemblies for supporting each of said laser and target support bars on said crossbar assemblies to enable projecting a laser beam from said laser source toward said target.

2. A laser conversion kit according to claim 1, wherein:

a) said laser gauge assembly further includes structure enabling rotation of said laser source about an axis perpendicular to said laser support bar.

3. A laser conversion kit according to claim 2, wherein:

a) said laser gauge assembly includes a measuring scale for measuring horizontal angular displacement of said laser beam.

4. A laser conversion kit according to claim 2, wherein:

a) said laser gauge assembly further includes structure enabling rotation of said laser source about an axis parallel with said laser support bar.

5. A laser conversion kit according to claim 4, wherein:

a) said laser gauge assembly includes a scale for indicating vertical angular displacement of said laser beam.

6. A laser conversion kit according to claim 1, wherein:

a) said laser gauge assembly includes a central laser source and a pair of laterally spaced outboard laser sources; and b) said target gauge assemblies each include a central target and a pair of laterally spaced outboard targets in spaced alignment respectively with said outboard laser sources to enable receiving respective laser beams projected from said outboard laser sources.

7. A laser conversion kit according to claim 6, wherein:

a) one of said laser sources projects a laser beam in a first direction along a longitudinal axis of the vehicle; and b) the remaining ones of said laser sources project respective laser beams in an opposed, second direction along the longitudinal axis.

8. A laser conversion kit according to claim 6, wherein:

a) said laser gauge assembly includes structure enabling rotation of said central laser source about an axis perpendicular to said laser support bar.

9. A laser conversion kit according to claim 1, wherein:

a) said targets are constructed of a transparent material.

10. A laser conversion kit according to claim 1, wherein:

a) said targets each include sighting indicia.

11. A laser conversion kit according to claim 1, wherein:

a) each of said alignment gauges, said laser gauge assembly and said target gauge assembly includes coupling structure for coupling with a center assembly.

12. A laser conversion kit according to claim 1, wherein:

a) each of said center assemblies includes an aperture; and b) each of said laser and target support bars includes a center pin for coupling with said aperture.

13. A laser conversion kit according to claim 1, wherein:
a) each of said center assemblies includes an upstanding center pin; and
b) each of said laser and target support bars includes a center aperture for receiving said pin.

14. A laser conversion kit according to claim 1, wherein:
a) each of said laser and target support bars includes a pair of spaced supports engaging respective crossbar assemblies for supporting each of said laser and target support bars on said crossbar assemblies in a level orientation.

15. A laser based vehicle frame alignment system comprising:
a) a plurality of alignment gauges, each gauge including a center assembly and a laterally adjustable crossbar assembly, said crossbar assembly having lateral ends coupled with respective upright members for supporting the gauges from and beneath a vehicle frame structure and in fixed spaced relation therealong;
b) at least one of said gauges having a laser gauge assembly including a generally horizontal laser support bar supporting a laser source beneath said frame structure;
c) at least one other of said gauges having a target gauge assembly including a generally horizontal target support bar supporting a target beneath said frame structure; and
d) each of said laser and target support bars engaging respective crossbar assemblies for supporting each of said laser and target support bars on said crossbar assemblies to enable projecting a laser beam from said laser source toward said target.

16. The laser based vehicle alignment system according to claim 15, wherein:
a) said laser gauge assembly further includes structure enabling rotation of said laser source about an axis perpendicular to said laser support bar.

17. The laser based vehicle alignment system according to claim 15, wherein:
a) said laser gauge assembly further includes structure enabling rotation of said laser source about an axis parallel with said laser support bar.

18. The laser based vehicle alignment system according to claim 15, wherein:
a) said laser gauge assembly includes a central laser source and a pair of laterally spaced outboard laser sources; and
b) said target gauge assembly includes a central target and a pair of laterally spaced outboard targets in spaced alignment respectively with said outboard laser sources to enable receiving respective laser beams projected from said lateral outboard laser sources.

19. The laser based vehicle alignment system according to claim 15, wherein:
a) one of said laser sources projects a laser beam in a first direction along a longitudinal axis of the vehicle; and
b) the remaining one of said laser sources project respective laser beams in an opposed, second direction along the longitudinal axis.

20. The laser based vehicle alignment system according to claim 15, wherein:
a) said laser gauge assembly includes structure enabling rotation of said central laser source about an axis perpendicular to said laser support bar.

21. The laser based vehicle alignment system according to claim 20, wherein:
a) said laser gauge assembly further includes structure enabling rotation of said laser source about an axis parallel with said laser support bar.

22. The laser based vehicle alignment system according to claim 15, wherein:
a) said targets are constructed of a transparent material.

23. A laser based vehicle alignment system according to claim 15, wherein:
a) said targets each include sighting indicia.

24. A laser based vehicle alignment system according to claim 15, wherein:
a) each of said laser and target support bars includes a pair of spaced supports engaging respective crossbar assemblies for supporting each of said laser and target support bars on said crossbar assemblies in a level orientation.

25. A method of aligning a vehicle frame, said method comprising the steps of:
a) providing a laser alignment gauge and a plurality of target gauges, each gauge including a center assembly and a laterally adjustable crossbar assembly, said crossbar assembly having lateral ends coupled with respective upright members for supporting the gauges from and beneath a vehicle frame structure and in fixed spaced relation therealong;
b) providing said laser alignment gauge with a center laser source rotatable about an axis perpendicular to said laser alignment gauge;
c) providing said target gauges with respective targets;
d) positioning said laser gauge beneath said frame structure of a vehicle at an undamaged point near the vehicle center;
e) positioning one of said target gauges adjacent and beneath each of the frontward and rearward portions of said vehicle frame structure;
f) first projecting a laser light beam in a first direction toward one of said targets;
g) observing the placement of said laser light beam on said target;
h) rotating said laser source to an opposed position;
i) next projecting a laser light beam in a second, opposed direction toward an opposed one of said targets; and
j) measuring the placement of said laser light beam on said second target to evaluate alignment of both said forward and said rearward portion of said vehicle frame structure.

26. The method according to claim 25, wherein:
a) said laser gauge includes a central laser light source and a pair of spaced lateral laser light sources;
b) said target gauges each include a central target and a pair of spaced lateral targets; and
c) after step (e), rotating said central laser light source to an opposed position;
d) projecting laser light beams in first and second opposed directions; and
e) observing the placement of said laser light beams on said respective targets for simultaneously evaluating alignment of forward and rearward portions of said vehicle frame structure.

* * * * *